(12) United States Patent
Song et al.

(10) Patent No.: US 8,891,270 B2
(45) Date of Patent: Nov. 18, 2014

(54) VOLTAGE ADJUSTING CIRCUIT AND CONTACTLESS CARD AND CONTACTLESS CARD SYSTEM WHICH INCLUDE THE SAME

(75) Inventors: Il Jong Song, Yongin si (KR); Jong Pil Cho, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 249 days.

(21) Appl. No.: 13/437,354

(22) Filed: Apr. 2, 2012

(65) Prior Publication Data

US 2012/0250377 A1  Oct. 4, 2012

(30) Foreign Application Priority Data

Apr. 4, 2011  (KR) ........................ 10-2011-0030881

(51) Int. Cl.
*H02M 7/00* (2006.01)
*H02M 7/08* (2006.01)
*H02M 7/06* (2006.01)
*H02J 5/00* (2006.01)

(52) U.S. Cl.
CPC ............... *H02J 5/005* (2013.01); *H02M 7/066* (2013.01); *H02M 7/06* (2013.01)
USPC ............................................ 363/125; 363/67

(58) Field of Classification Search
CPC ........... G05T 3/20; H02M 7/06; H02M 7/217
USPC ...................................... 363/67, 81, 125–127
See application file for complete search history.

(56) References Cited

U.S. PATENT DOCUMENTS

| | | | | |
|---|---|---|---|---|
| 5,461,297 | A | * | 10/1995 | Crawford ..................... 320/166 |
| 5,687,071 | A | * | 11/1997 | Debruyne et al. ............ 363/127 |
| 6,011,958 | A | * | 1/2000 | Yokota et al. .................. 455/73 |
| 6,134,130 | A | * | 10/2000 | Connell et al. ................. 363/89 |
| 6,630,858 | B1 | * | 10/2003 | Takabayashi ................. 327/538 |
| 6,659,352 | B1 | * | 12/2003 | Asada et al. .................. 235/492 |
| 6,747,440 | B2 | | 6/2004 | Weder |
| 6,891,475 | B2 | * | 5/2005 | Bui et al. ..................... 340/572.1 |
| 7,141,939 | B2 | * | 11/2006 | Nagasawa et al. ............ 315/291 |
| 7,756,223 | B2 | * | 7/2010 | Missoni ........................ 375/340 |
| 7,800,436 | B2 | * | 9/2010 | Yamazaki ..................... 329/350 |
| 2003/0197598 | A1 | * | 10/2003 | Hayashi .................. 340/310.07 |
| 2005/0134435 | A1 | * | 6/2005 | Koyama et al. ............ 340/10.34 |
| 2005/0168159 | A1 | * | 8/2005 | Nagasawa et al. ............ 315/224 |
| 2005/0205679 | A1 | * | 9/2005 | Alihodzic ..................... 235/492 |
| 2006/0131428 | A1 | * | 6/2006 | Wang et al. ................... 235/492 |
| 2006/0261797 | A1 | * | 11/2006 | Man et al. ..................... 323/314 |
| 2006/0273176 | A1 | * | 12/2006 | Audebert et al. ............. 235/451 |
| 2008/0083969 | A1 | * | 4/2008 | Osada ........................... 257/595 |

(Continued)

FOREIGN PATENT DOCUMENTS

| | | |
|---|---|---|
| EP | 1089217 | 4/2001 |
| JP | 2005-216134 | 8/2005 |
| JP | 2009-181433 | 8/2009 |

*Primary Examiner* — Timothy J Dole
*Assistant Examiner* — Yusef Ahmed
(74) *Attorney, Agent, or Firm* — Ellsworth, PLLC

(57) ABSTRACT

A voltage adjusting circuit includes an inducing circuit configured to induce a voltage from electromagnetic waves, a first rectifying circuit configured to rectify an output signal of the inducing circuit, a second rectifying circuit configured to rectify the output signal of the inducing circuit, a first regulator configured to regulate an output signal of the first rectifying circuit, and a second regulator configured to regulate an output signal of the second rectifying circuit.

16 Claims, 8 Drawing Sheets

(56) References Cited

U.S. PATENT DOCUMENTS

| | | |
|---|---|---|
| 2009/0067207 A1* | 3/2009 | Nishino .......................... 363/126 |
| 2009/0091959 A1* | 4/2009 | Takahashi et al. ............. 363/126 |
| 2010/0177232 A1* | 7/2010 | Yu ................................. 348/308 |
| 2010/0213909 A1* | 8/2010 | Nakashimo ................... 323/282 |
| 2010/0252631 A1* | 10/2010 | Kargl ............................ 235/444 |
| 2011/0248693 A1* | 10/2011 | Karnik et al. ................. 323/280 |
| 2012/0250383 A1* | 10/2012 | Song et al. .................... 363/126 |
| 2013/0223116 A1* | 8/2013 | Cho et al. ........................ 363/74 |

* cited by examiner

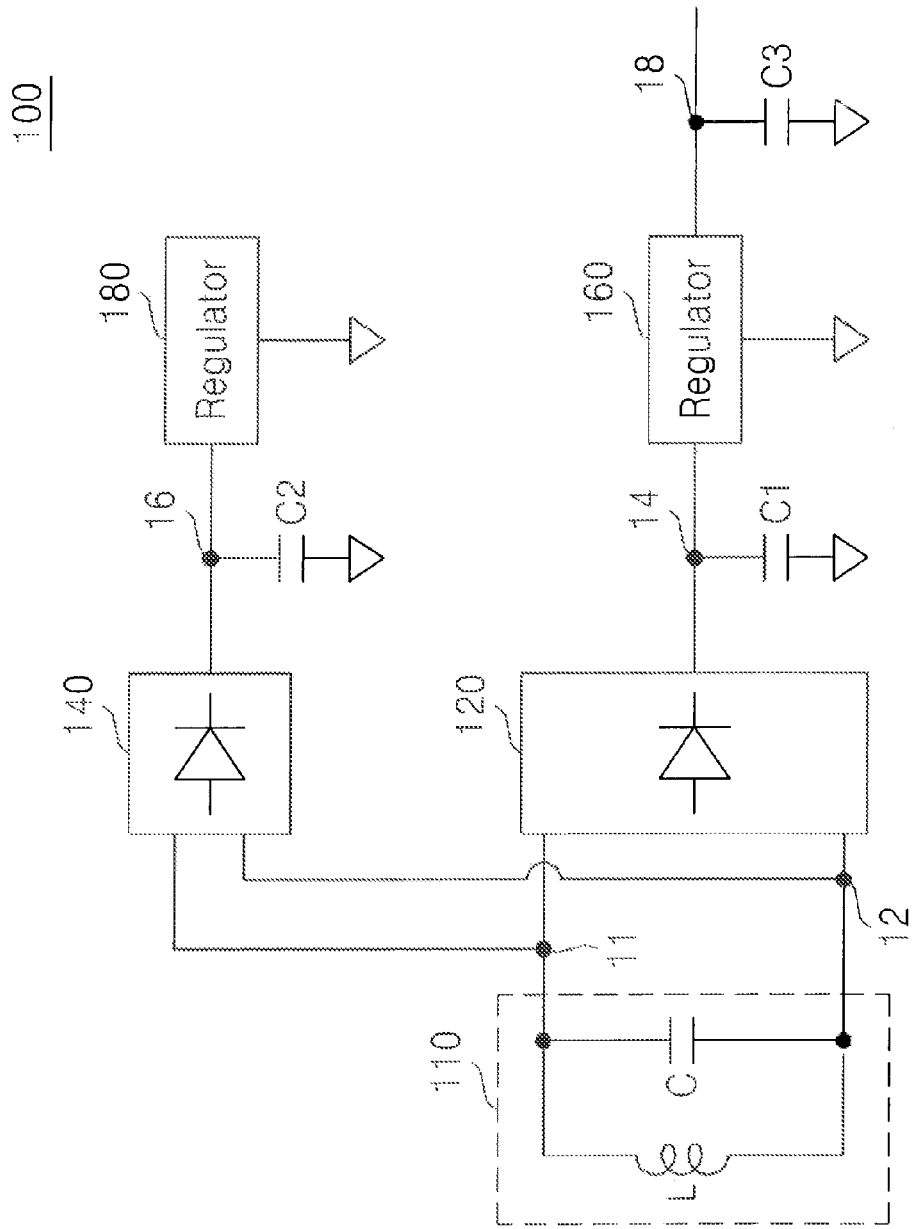

VOLTAGE ADJUSTING CIRCUIT AND CONTACTLESS CARD AND CONTACTLESS CARD SYSTEM WHICH INCLUDE THE SAME

CROSS-REFERENCE TO RELATED APPLICATIONS

This application claims priority under 35 U.S.C. §119(a) from Korean Patent Application No. 10-2011-0030881 filed on Apr. 4, 2011, the disclosure of which is hereby incorporated by reference in its entirety.

BACKGROUND OF THE INVENTION

1. Field of the Invention

The present general inventive concept relates to a voltage adjusting circuit, and more particularly, to a voltage adjusting circuit to generate a constant power regardless of an external environment such as a distance between a card reader and a contactless card and a contactless card and a contactless card system which include the same.

2. Description of the Related Art

Contactless card systems, and more particularly, smart card systems use contactless information recognition technology in which a card reader recognizes a smart card, which is several centimeters away from the card reader, and transmits and receives information to and from the smart card using a radio frequency.

A contactless card is supplied with power by inducing voltage from electromagnetic waves emitted by a card reader. Accordingly, the power induced in the contactless card changes depending on a distance between the contactless card and the card reader or the like. When power exceeding what is needed to drive the contactless card is induced in the contactless card, an internal logic circuit in the contactless card may malfunction or break down due to the excessive power.

To overcome this problem, constant power needs to be supplied to the internal logic circuit of the contactless card regardless of external environments.

SUMMARY OF THE INVENTION

Some embodiments of the present inventive concept provide a voltage adjusting circuit to supply constant power to an internal logic circuit regardless of an external environment and a contactless card and a contactless card system which include the same.

According to exemplary embodiments of the present inventive concept, there is provided a voltage adjusting circuit including an inducing circuit configured to induce a voltage from electromagnetic waves, a first rectifying circuit configured to rectify an output signal of the inducing circuit, a second rectifying circuit configured to rectify the output signal of the inducing circuit, a first regulator configured to regulate an output signal of the first rectifying circuit, and a second regulator configured to regulate an output signal of the second rectifying circuit.

The second regulator may include at least one diode connected in series between an output terminal of the second rectifying circuit and a ground. The second regulator may include a diode including an anode connected with an output terminal of the second rectifying circuit and a cathode connected to a ground.

The voltage adjusting circuit may further include a third rectifying circuit configured to rectify the output signal of the inducing circuit. The second regulator may control the output signal of the second rectifying circuit in response to an output signal of the third rectifying circuit. At this time, the second regulator may include a comparator configured to compare the output voltage of the third rectifying circuit with a reference voltage and a switching circuit configured to control the output signal of the second rectifying circuit in response to an output signal of the comparator. The second regulator may further include a voltage divider connected between an output terminal of the third rectifying circuit and an input terminal of the comparator. The switching circuit may be a transistor functioning as a shunt.

The voltage adjusting circuit may further include a first capacitor connected between an output terminal of the first rectifying circuit and a ground, a second capacitor connected between an output terminal of the second rectifying circuit and the ground, and a third capacitor connected between an output terminal of the third rectifying circuit and the ground.

According to other exemplary embodiments of the present inventive concept, there is provided a contactless card including the voltage adjusting circuit and an internal logic circuit configured to receive a direct current (DC) voltage from the first regulator and process data received or transmitted through the inducing circuit.

The second regulator may include at least one diode connected in series between an output terminal of the second rectifying circuit and a ground. The voltage adjusting circuit may further include a third rectifying circuit configured to rectify the output signal of the inducing circuit, and the second regulator may control the output signal of the second rectifying circuit in response to an output signal of the third rectifying circuit. The second regulator may include a comparator configured to compare the output voltage of the third rectifying circuit with a reference voltage and a switching circuit configured to control the output signal of the second rectifying circuit in response to an output signal of the comparator.

According to further exemplary embodiments of the present inventive concept, there is provided a contactless card system including the contactless card and a card reader configured to supply power to the contactless card using a radio system and communicate with the contactless card.

According to further exemplary embodiments of the present inventive concept, there is provided a contactless card, including: a voltage adjusting circuit having a first rectifying circuit configured to rectify an induced voltage, a second rectifying circuit configured to rectify the induced voltage, and a regulating system configured to regulate an output signal of the first rectifying circuit and an output signal of the second rectifying circuit.

In an embodiment, the contactless card may further include an inducing circuit configured to generate the induced voltage from received electromagnetic waves.

In an embodiment, the contactless card may further include an internal logic circuit configured to receive the regulated signal from the first rectifying circuit and process data received or transmitted through the inducing circuit.

In an embodiment, the regulating system may include a first regulator configured to regulate an output signal of the first rectifying circuit and a second regulator configured to regulate an output signal of the second rectifying circuit.

In an embodiment, the contactless card may further include a third rectifying circuit configured to rectify the induced voltage such that the regulating system regulates an output signal of the third rectifying circuit and controls the regulated output signal of the second rectifying circuit based on the regulated output signal of the third rectifying circuit.

In an embodiment, the regulating system may include a comparator configured to compare the output signal of the third rectifying circuit with a reference voltage and a switching circuit configured to control the output signal of the second rectifying circuit in response to an output signal of the comparator.

In an embodiment, the regulating system further includes a voltage divider connected between an output terminal of the third rectifying circuit and an input terminal of the comparator.

BRIEF DESCRIPTION OF THE DRAWINGS

The above and other features and/or utilities of the present general inventive concept will become apparent and more readily appreciated from the following description of the embodiments, taken in conjunction with the accompanying drawings of which:

FIG. 2 is a schematic block diagram of a voltage adjusting circuit illustrated in FIG. 1;

DETAILED DESCRIPTION OF THE PREFERRED EMBODIMENTS

Figure 1:
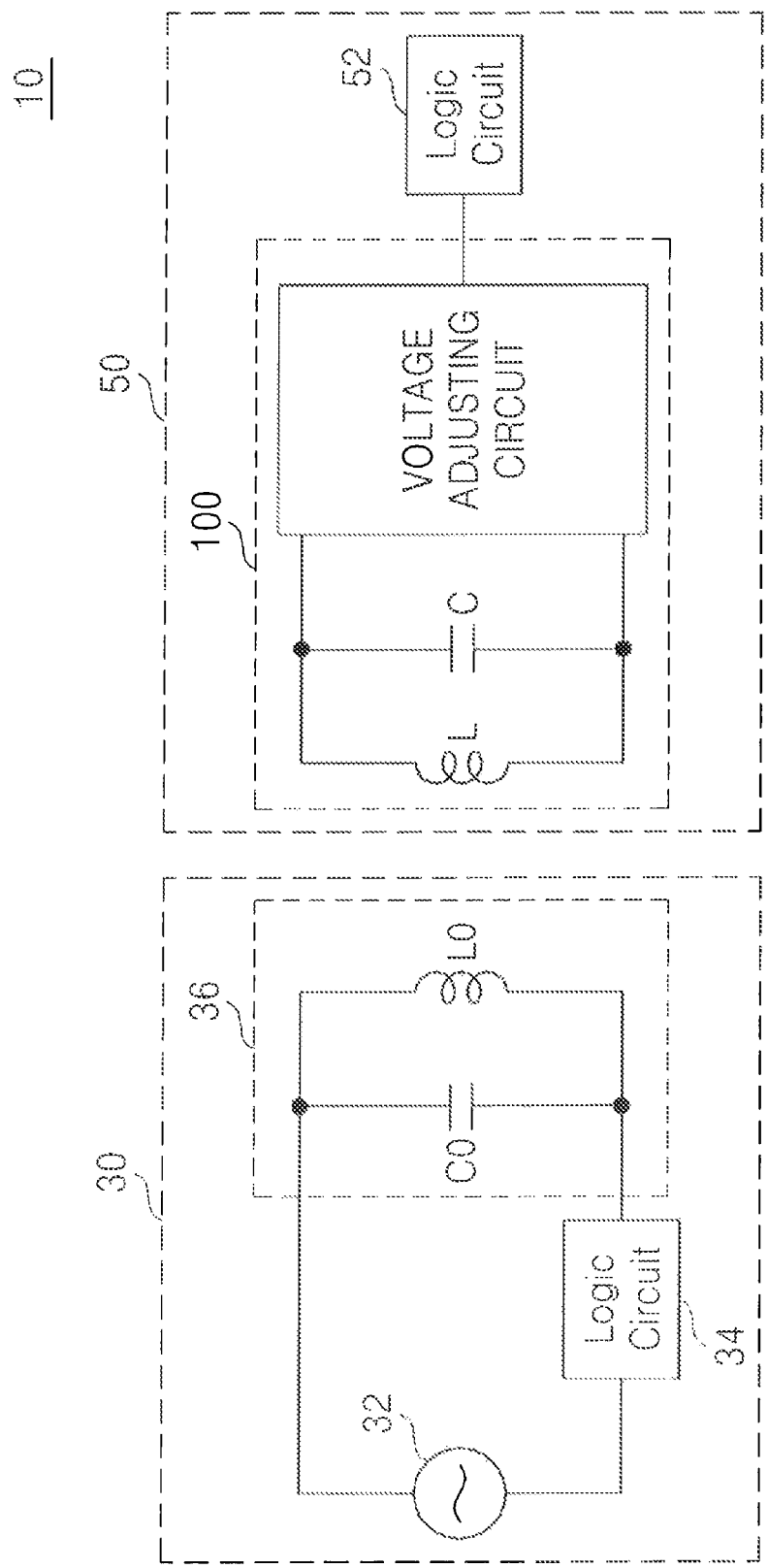
FIG. 1 is a diagram of a contactless card system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a diagram of a contactless card system according to the an exemplary embodiment of the present general inventive concept. Referring to FIG. 1, the contactless card system 10 includes a card reader 30 and a contactless card 50.

The card reader 30 may supply energy to the contactless card 50 by emitting electromagnetic waves and communicate with the contactless card 50. The card reader 30 includes a power supply 32, a logic circuit 34, and a resonant circuit 36. The power supply 32 supplies power so that the card reader 30 operates. The power supply 32 may be an alternating current (AC) power supply. The logic circuit 34 processes data to be transmitted to the contactless card 50 and data received from the contactless card 50.

The resonant circuit 36 emits energy necessary to drive the contactless card 50 and to transmit data to the contactless card 50 in a form of electromagnetic waves. The resonant circuit 36 may also receive electromagnetic waves emitted by the contactless card 50. The resonant circuit 36 may include a capacitor C0 and an inductor L0 which are connected in parallel with each other. The resonant circuit 36 may function as an antenna.

The contactless card 50 receives electromagnetic waves emitted by the card reader 30 and emits electromagnetic waves to the card reader 30 after processing data. The contactless card 50 includes a voltage adjusting circuit 100 and an internal logic circuit 52.

The voltage adjusting circuit 100 receives electromagnetic waves emitted by the card reader 30 and rectifies and regulates the electromagnetic waves. The voltage adjusting circuit 100 provides a regulated voltage to the internal logic circuit 52. The internal logic circuit 52 is provided with a direct current (DC) voltage by the voltage adjusting circuit 100 and processes data which has been received or will be transmitted through the voltage adjusting circuit 100.

FIG. 2 is a schematic block diagram of an exemplary voltage adjusting circuit 100 of FIG. 1 in accordance with an embodiment of the present inventive concept. Referring to FIGS. 1 and 2, the voltage adjusting circuit 100 of FIG. 2 includes an inducing circuit 110, a first rectifying circuit 120, a second rectifying circuit 140, and a first regulator 160, and a second regulator 180.

The inducing circuit 110 may receive electromagnetic waves emitted by the card reader 30 and emit electromagnetic waves to the card reader 30. The inducing circuit 110 may induce a voltage from the electromagnetic waves received from the card reader 30. The inducing circuit 110 may function as an antenna. The inducing circuit 110 of FIG. 2 includes a resonant circuit in which an inductor L and a capacitor C are connected in parallel with each other.

The first rectifying circuit 120 rectifies an output signal of the inducing circuit 110 and provides a rectified output signal to the first regulator 160. In other words, the first rectifying circuit 120 rectifies an AC voltage corresponding to the output signal of the inducing circuit 110 to a DC voltage and provides the rectified DC voltage to the first regulator 160. Input terminals of the first rectifying circuit 120 are respectively connected with output terminals of the inducing circuit 110 at nodes 11 and 12. An output terminal of the first rectifying circuit 120 is connected with an input terminal of the first regulator 160 at node 14.

The second rectifying circuit 140 rectifies the output signal of the inducing circuit 110 and provides a rectified output signal to the second regulator 180. In detail, the second rectifying circuit 140 rectifies an AC voltage corresponding to the output signal of the inducing circuit 110 to a DC voltage and provides the rectified DC voltage to the second regulator 180. Input terminals of the second rectifying circuit 140 are respectively connected with the output terminals of the inducing circuit 110 at the nodes 11 and 12. An output terminal of the second rectifying circuit 140 is connected with an input terminal of the second regulator 180 at node 16.

The first regulator 160 receives and regulates an output signal of the first rectifying circuit 120 and provides a regulated output signal to the internal logic circuit 52. In other words, the first regulator 160 regulates the output voltage of the first rectifying circuit 120 to a driving voltage necessary to drive the internal logic circuit 52 and provides the regulated driving voltage to the internal logic circuit 52.

The second regulator 180 receives and regulates an output signal of the second rectifying circuit 140. The input terminal of the second regulator 180 is connected with the output terminal of the second rectifying circuit 140 at node 16 and an output terminal of the second regulator 180 is connected to a ground.

The second regulator 180 flows current generated by the output voltage of the second rectifying circuit 140 to the ground when the output voltage of the second rectifying circuit 140 is higher than a predetermined reference voltage (Vref). In addition, the second regulator 180 blocks the flow of current between the output terminal of the second rectifying circuit 140 and the ground when the output voltage of the second rectifying circuit 140 is lower than the reference voltage (Vref). In other words, the second regulator 180 may be implemented by a variable resistor whose resistance varies with the magnitude of the output voltage of the second rectifying circuit 140.

The voltage adjusting circuit 100 may also include a first capacitor C1 connected between the output terminal of the first rectifying circuit 120 and the ground (i.e., the first capacitor C1 may be connected at node 14), a second capacitor C2 connected between the output terminal of the second rectifying circuit 140 and the ground (i.e., the second capacitor C2 may be connected at node 16), and a third capacitor C3 connected between the output terminal of the first regulator 160 and the ground (i.e., the third capacitor C3 may be connected at node 18). The first capacitor C1 may remove ripples from the output voltage of the first rectifying circuit 120. The second capacitor C2 may remove ripples from the output voltage of the second rectifying circuit 140. The third capacitor C3 may remove ripples from an output voltage of the first regulator 160. In other words, the first through third capacitors C1 through C3 function as a low pass filter.

Figure 3A:
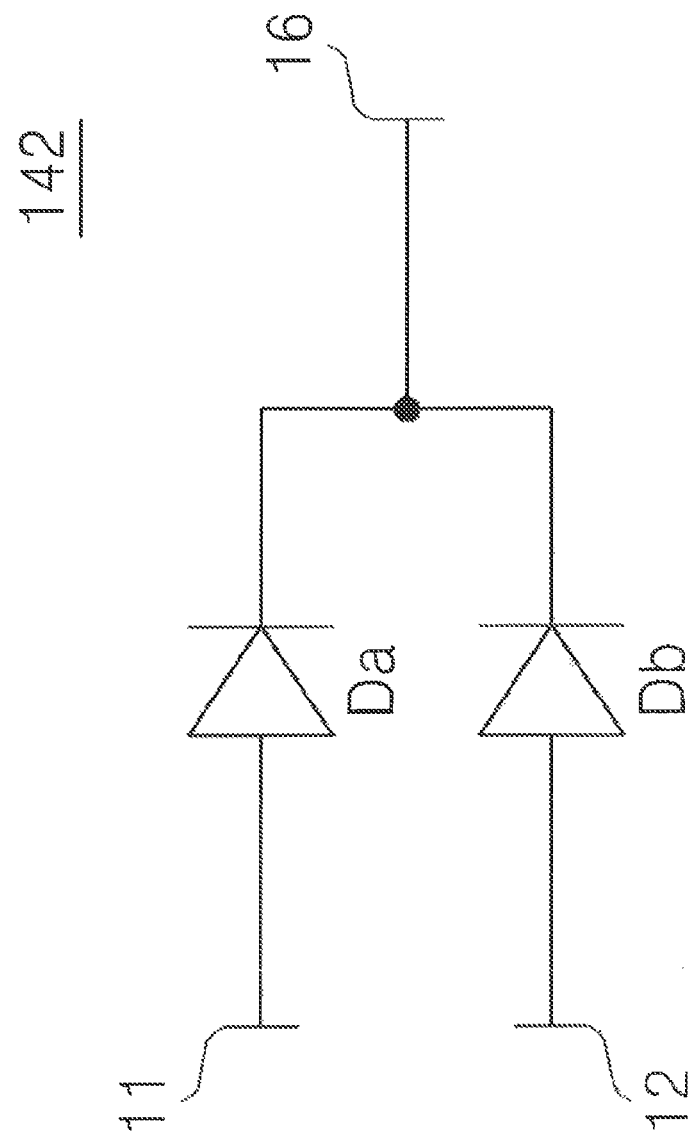
FIG. 3A is a diagram of a rectifying circuit illustrated in FIG. 2, according to another exemplary embodiment of the present general inventive concept.

FIG. 3A is a diagram of an exemplary second rectifying circuit illustrated in FIG. 2, according to exemplary embodiment of the present general inventive concept. Referring to FIGS. 2 and 3A, the exemplary second rectifying circuit 142 is an example of the second rectifying circuit 140 illustrated in FIG. 2. The second rectifying circuit 142 includes diodes Da and Db respectively connected with the output terminals of the inducing circuit 110 (i.e., connected to the output terminals of the inducing circuit 10 at nodes 11 and 12, respectively). The diodes Da and Db rectify the output signal of the inducing circuit 110. Consequently, the exemplary second rectifying circuit 142 rectifies an AC voltage, i.e., the output voltage of the inducing circuit 110 to a DC voltage and outputs the rectified DC voltage.

Figure 3B:
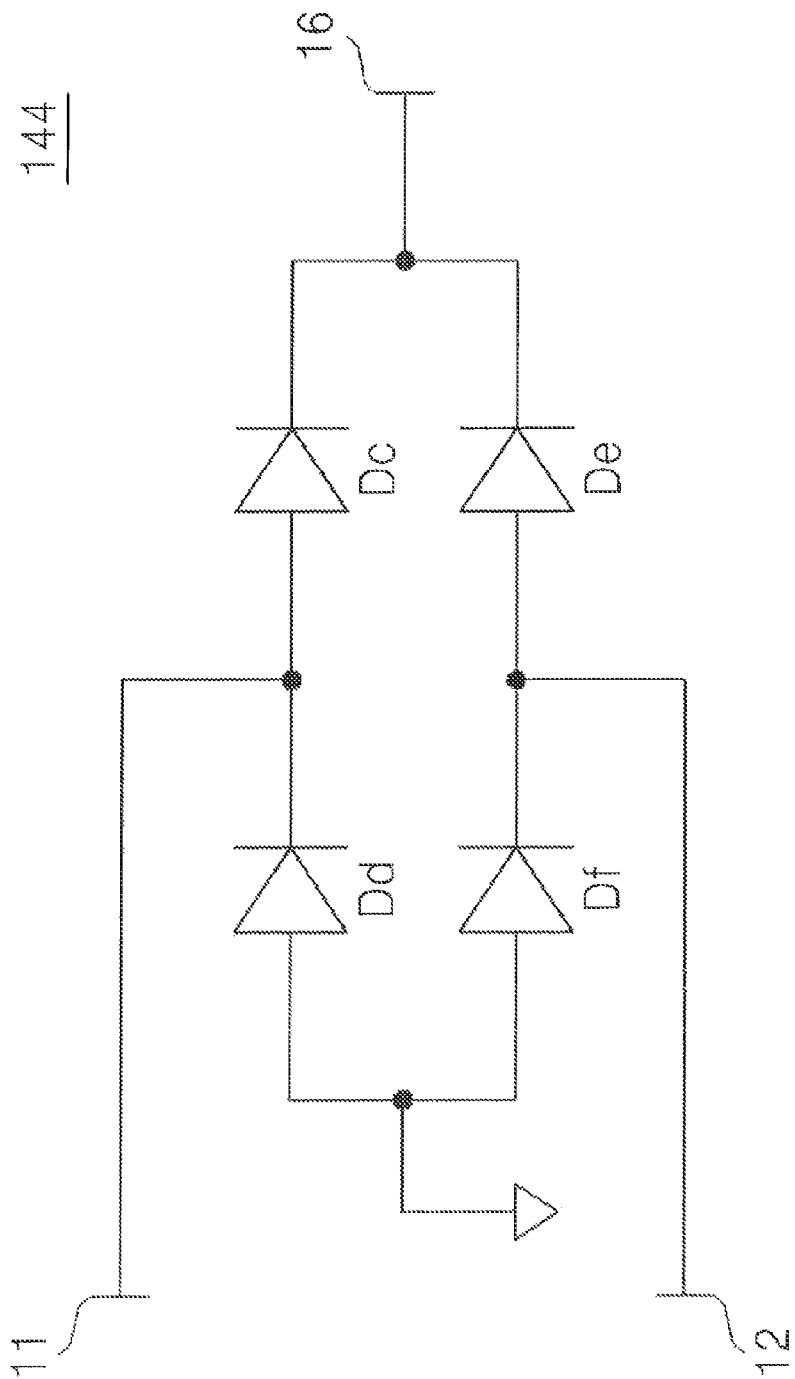
FIG. 3B is a diagram of a another rectifying circuit illustrated in FIG. 2, according to yet another exemplary embodiment of the present general inventive concept.

FIG. 3B is a diagram of another exemplary second rectifying circuit illustrated in FIG. 2, according to yet another exemplary embodiment of the present general inventive concept. Referring to FIGS. 2 and 3B, the exemplary second rectifying circuit 144 is another example of the second rectifying circuit 140 illustrated in FIG. 2. The second rectifying circuit 144 includes diodes Dc and Dd connected with the output terminal of the inducing circuit 110 at node 11 and diodes De and Df connected with the output terminal of the inducing circuit 110 at node 12. The diodes Dc, Dd, De, and Df included in the second rectifying circuit 144 rectify the output signal of the inducing circuit 110. Consequently, the second rectifying circuit 144 rectifies an AC voltage, i.e., the output voltage of the inducing circuit 110 to a DC voltage and outputs the rectified DC voltage.

The second rectifying circuit 144 illustrated in FIG. 3B is a bridge rectifier including four diodes. However, the present inventive concept is not restricted to the illustrated exemplary embodiments. The second rectifying circuit 140 may have different structures in different embodiments which will provide the intended purposes as described herein. The first rectifying circuit 120 may also have the same structure as the second rectifying circuit 140. Thus, a detailed description thereof will be omitted.

Figure 4:
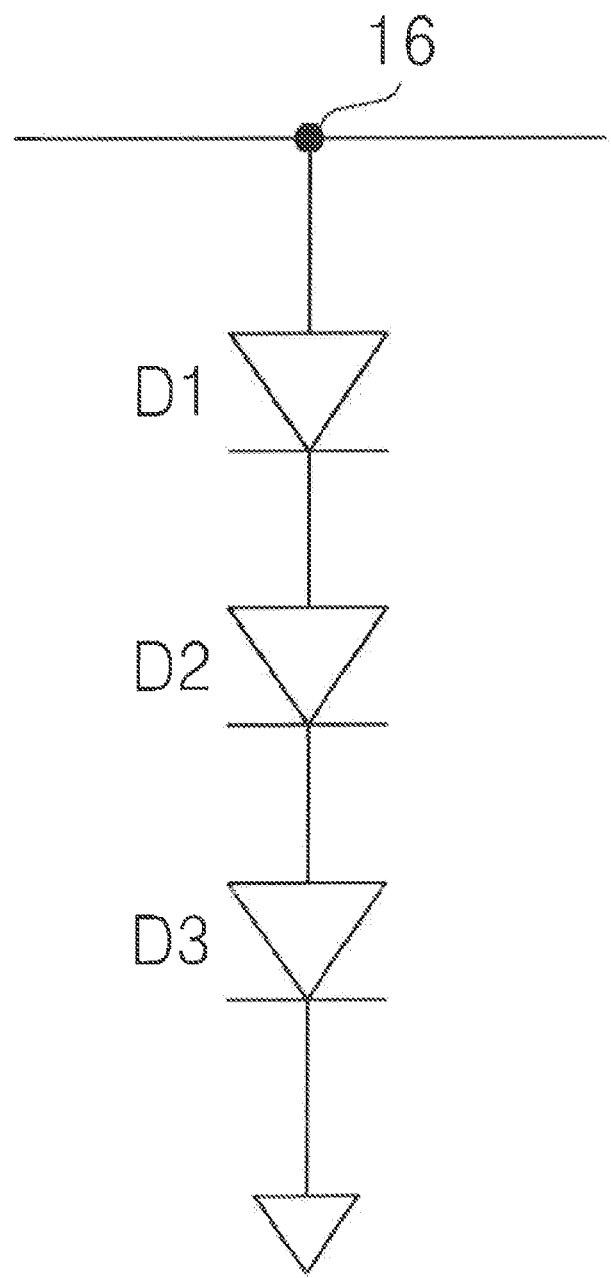
FIG. 4 is a diagram of an exemplary regulator usable in FIG. 2, according to an exemplary embodiment of the present general inventive concept.

FIG. 4 is a diagram of an exemplary second regulator illustrated in FIG. 2, according to an exemplary embodiment of the present general inventive concept. Referring to FIGS. 1 through 4, the second regulator 182 of FIG. 4 is an example of the second regulator 180 illustrated in FIG. 2. The exemplary second regulator 182 includes at least one diode connected in series between the output terminal of the second rectifying circuit 140 and the ground (i.e., connected at node 16 where the output terminal of the second rectifying circuit 140 is connected). The exemplary second regulator 182 illustrated in FIG. 4 may include three diodes D1, D2, and D3, but the present inventive concept is not restricted to the exemplary illustrated embodiments.

Hereinafter, the operation of the voltage adjusting circuit 100 including the exemplary second regulator 182 will be described in detail. It is assumed that the driving voltage of the internal logic circuit 52 is 2 V and that the diodes D1, D2, and D3 included in the second regulator 182 have a threshold voltage of 1V.

A case where an excessive voltage than needed to drive the internal logic circuit 52 is induced will be described. The second rectifying circuit 140 rectifies an AC voltage induced by the inducing circuit 110 to a DC voltage. Although the DC voltage rectified by the second rectifying circuit 140 may have a ripple voltage, the ripple voltage can be removed by the second capacitor C2.

The rectified DC voltage is equivalently divided into the diodes D1, D2, and D3 included in the second regulator 182. Since the threshold voltage of the diodes D1, D2, and D3 is 1

V, the diodes D1, D2, and D3 are turned on when a divided voltage input to each of the diodes D1, D2, and D3 is higher than 1 V. When the divided voltage is lower than 1 V, the diodes D1, D2, and D3 are turned off.

Accordingly, when a voltage induced by the inducing circuit 110 exceeds the driving voltage of the internal logic circuit 52, that is, when the divided voltage is higher than 1 V, all of the diode D1, D2, and D3 are turned on. When all of the diodes D1, D2, and D3 are turned on, the second regulator 182 allows a current to flow to the ground. As the current flows to the ground, excessively induced power is consumed, and therefore, the amount of power that would be provided to the internal logic circuit 52 is regulate to be reduced. Consequently, the second regulator 182 prevents the malfunction or the breakdown of the internal logic circuit 52 which may occur when an excessive voltage is induced.

A case where less voltage than needed to drive the internal logic circuit 52 is induced will now be described. The second rectifying circuit 140 rectifies an AC voltage induced by the inducing circuit 110 to a DC voltage. The rectified DC voltage is equivalently divided into the diodes D1, D2, and D3 included in the exemplary second regulator 182. A divided voltage in each of the diodes D1, D2, and D3 is less than the threshold voltage of the diodes D1, D2, and D3. Accordingly, the diodes D1, D2, and D3 are not turned on, but instead remain turned off. As a result, the second regulator 182 does not allow a current to flow to the ground and power is not consumed. Consequently, power induced by the inducing circuit 110 is specifically used to drive the internal logic circuit 52.

Figure 5:
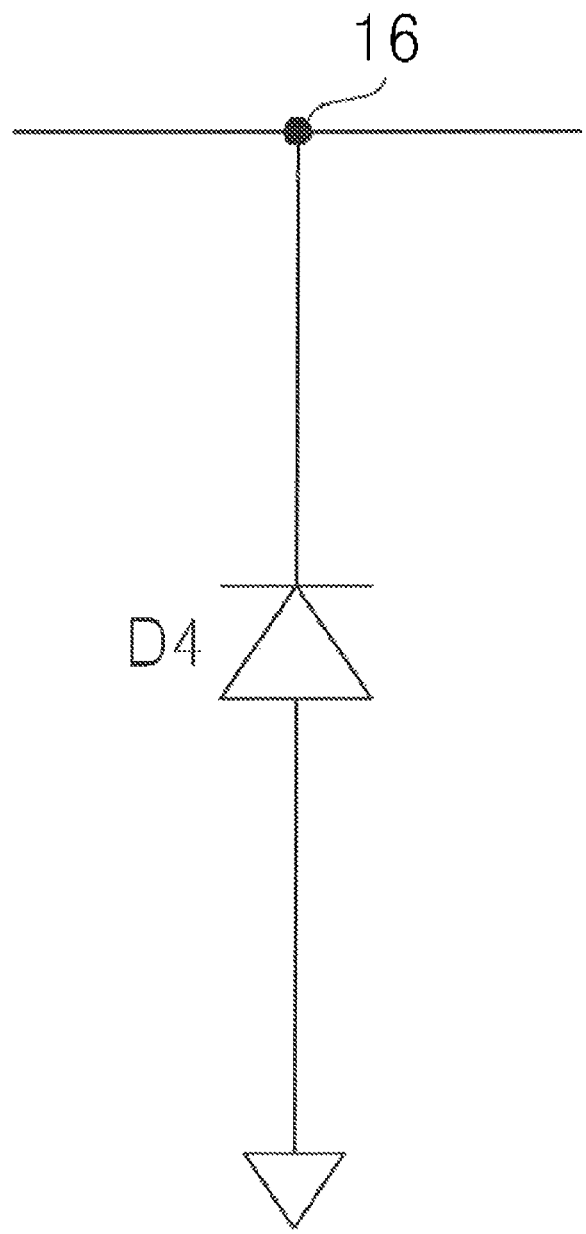
FIG. 5 is a diagram of another regulator usable in FIG. 2, according to still another exemplary embodiment of the present general inventive concept.

FIG. 5 is a diagram of another exemplary second regulator illustrated in FIG. 2, according to yet another exemplary embodiment of the present general inventive concept. Referring to FIGS. 1 through 3 and FIG. 5, the second regulator 184 is another example of the second regulator 180 illustrated in FIG. 2. The second regulator 184 includes a diode D4 which includes an anode connected with the output terminal of the second rectifying circuit 140 (at node 16) and a cathode connected to the ground. In other words, the diode D4 is connected backward between the second rectifying circuit 140 and the ground.

The second regulator 184 includes only one diode D4 in the embodiments illustrated in FIG. 5, but the present inventive concept is not restricted to the illustrated embodiments. The second regulator 184 may also include at least one diode connected in series with the diode D4.

Hereinafter, the operation of the voltage adjusting circuit 100 including the second regulator 184 will be described. The description of the same operation as that of the voltage adjusting circuit 100 including the second regulator 182 illustrated in FIG. 4 will be omitted. The second rectifying circuit 140 rectifies an AC voltage induced by the inducing circuit 110 to a DC voltage. The DC voltage rectified by the second rectifying circuit 140 may have a ripple voltage, but the ripple voltage can be removed by the second capacitor C2.

The DC voltage rectified by the second rectifying circuit 140 is provided to the diode D4 included in the second regulator 184. At this time, it is assumed that the breakdown voltage of the diode D4 is 3 V.

Since the breakdown voltage of the diode D4 is 3 V in this example, the diode D4 is turned on when the DC voltage provided to the diode D4 is higher than 3 V. When the DC voltage provided to the diode D4 is lower than 3 V, the diode D4 is turned off.

Accordingly, when the induced voltage exceeds a driving voltage to drive the internal logic circuit 52, that is, when the voltage provided to the second regulator 184 is higher than the breakdown voltage (3V) of the diode D4, the diode D4 is turned on. When the diode D4 is turned on, the second regulator 184 allows a current to flow to the ground. As the current flows to the ground, excessively induced power is consumed and the amount of power provided to the internal logic circuit 52 is regulated to be reduced.

Consequently, the second regulator 184 prevents a malfunction or a breakdown of the internal logic circuit 52 which may occur when an excessive voltage is induced.

A case where the induced voltage is less than the driving voltage to drive the internal logic circuit 52 will be described below. The second rectifying circuit 140 rectifies an AC voltage induced by the inducing circuit 110 to a DC voltage. The DC voltage rectified by the second rectifying circuit 140 is provided to the diode D4 included in the second regulator 184. The DC voltage provided to the diode D4 is lower than the breakdown voltage (3V) of the diode D4. Accordingly, the diode D4 is not turned on, but instead remains turned off.

As a result, the second regulator 184 does not allow a current to flow to the ground and power is not consumed. Consequently, power induced by the inducing circuit 110 is specifically used to drive the internal logic circuit 52.

Figure 6:
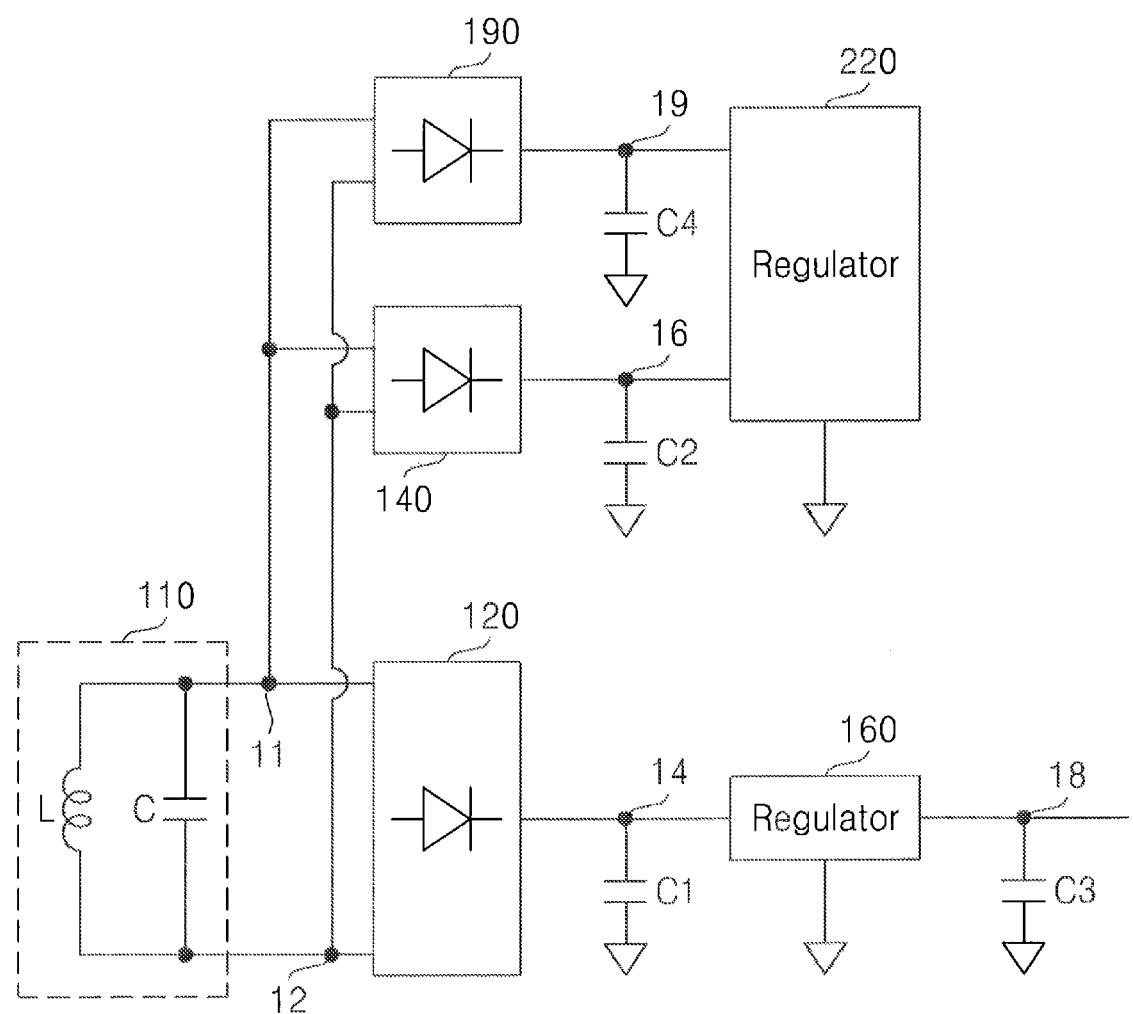
FIG. 6 is a diagram of a voltage adjusting circuit according to another embodiment of the present general inventive concept.

FIG. 6 is a diagram of a voltage adjusting circuit according to another embodiment of the present general inventive concept. The same description as that of the voltage adjusting circuit 100 illustrated in FIG. 2 will be omitted. Referring to FIGS. 1 and 6, the voltage adjusting circuit 200 according to the present exemplary embodiment includes the inducing circuit 110, the first rectifying circuit 120, the second rectifying circuit 140, a third rectifying circuit 190, the first regulator 160, and a second regulator 220.

The second rectifying circuit 140 rectifies an output signal of the inducing circuit 110 and provides a rectified output signal to the second regulator 220. In detail, the second rectifying circuit 140 rectifies an AC voltage induced by the inducing circuit 110 to a DC voltage and provides the rectified DC voltage to the second regulator 220. The input terminals of the second rectifying circuit 140 are connected with the output terminals of the inducing circuit 110 at nodes 11 and 12, respectively, and the output terminal 16 of the second rectifying circuit 140 is connected with an input terminal 16 of the second regulator 220.

The third rectifying circuit 190 rectifies the output signal of the inducing circuit 110 and provides a rectified output signal to the second regulator 220. In detail, the third rectifying circuit 190 rectifies the AC voltage induced by the inducing circuit 110 to a DC voltage and provides the rectified DC voltage to the second regulator 220. The third rectifying circuit 190 monitors the magnitude of the voltage induced by the inducing circuit 110. The third rectifying circuit 190 may be implemented in the same manner as the second rectifying circuit 140 illustrated in FIG. 2. Accordingly, the third rectifying circuit 190 may include four diodes like a bridge rectifying circuit or may be replaced with other various types of rectifying circuits.

The second regulator 220 controls an output signal of the second rectifying circuit 140 in response to an output signal of the third rectifying circuit 190. Input terminals of the second regulator 220 are respectively connected with the output terminal of the second rectifying circuit 140 at node 16 and an output terminal of the third rectifying circuit 190 at node 19. An output terminal of the second regulator 220 is connected to the ground. The second regulator 220 compares an output voltage of the third rectifying circuit 190 with a reference voltage (Vref) and controls the output signal of the second rectifying circuit 140 according to a comparison result.

The voltage adjusting circuit 200 may also include a fourth capacitor C4 connected between the output terminal of the third rectifying circuit 190 and the ground (i.e., connected between node 19 and ground). The fourth capacitor C4 may remove ripples from the output voltage of the third rectifying circuit 190. In other words, the fourth capacitor C4 functions as a low pass filter.

Figure 7:
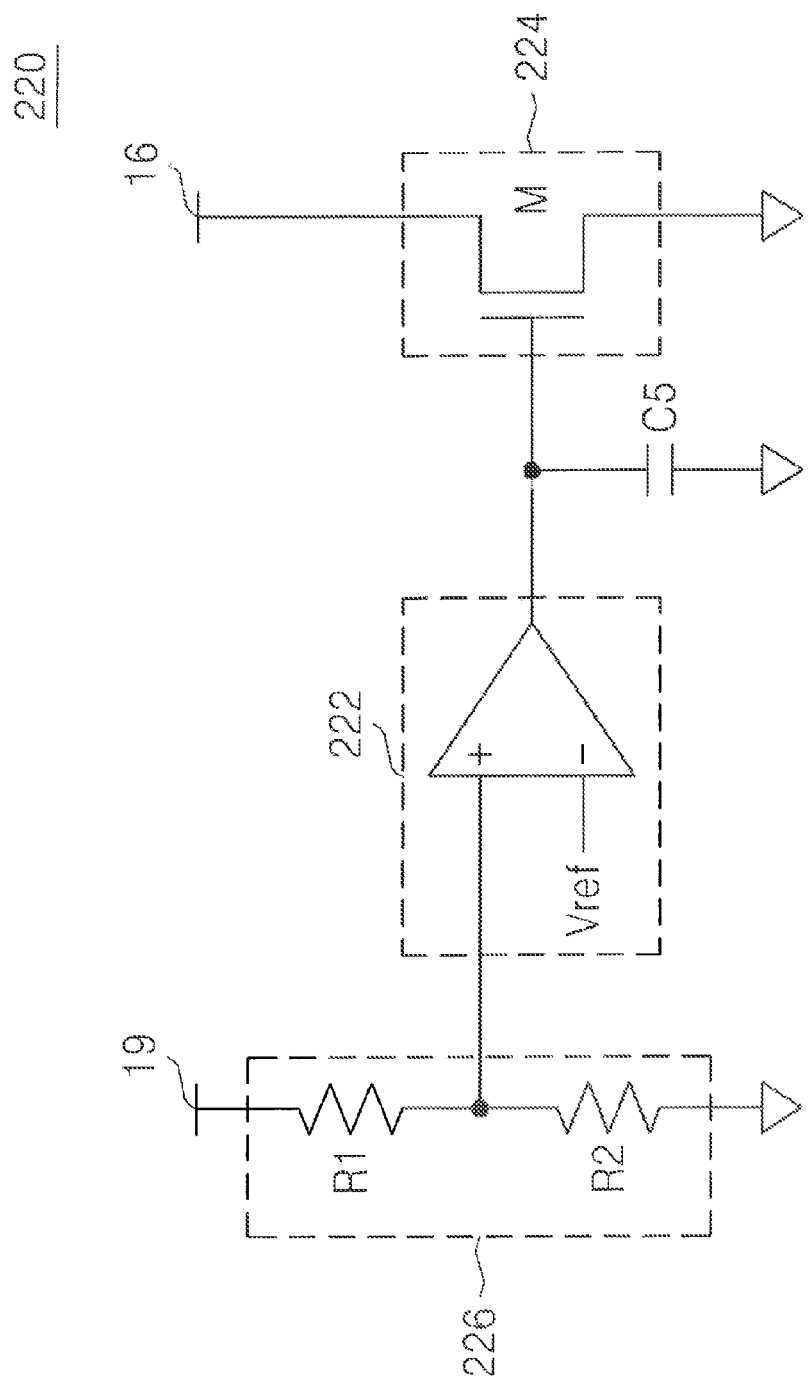
FIG. 7 is a diagram of an exemplary regulator usable in FIG. 6.

FIG. 7 is a diagram of an exemplary second regulator illustrated in FIG. 6. Referring to FIGS. 6 and 7, the second regulator 220 of the present embodiment includes a comparator 222, a switching circuit 224, and a voltage divider 226.

The voltage divider 226 divides the output voltage of the third rectifying circuit 190 and outputs a divided voltage to the comparator 222. In the present exemplary embodiment, the voltage divider 226 includes resistors R1 and R2 connected in series between the output terminal of the third rectifying circuit 190 and the ground (i.e., between node 19 and ground). Although the voltage divider 226 illustrated in FIG. 7 includes the two resistors R1 and R2, the number of resistors may be changed in other embodiments. The voltage divider 226 outputs the divided voltage according to a resistance ratio between the resistors R1 and R2. The comparator 222 compares the output voltage of the voltage divider 226 with the reference voltage (Vref) and outputs the comparison result to the switching circuit 224.

A fifth capacitor C5 may be provided between an output terminal of the comparator 222 and the ground. The fifth capacitor C5 performs the same function as the first through fourth capacitors C1 through C4. In other words, the fifth capacitor C5 removes ripples from an output signal of the comparator 222.

The switching circuit 224 controls the output signal of the second rectifying circuit 140 in response to the output signal of the comparator 222. The switching circuit 224 may be implemented by a metal oxide semiconductor (MOS) transistor M.

An operation of the second regulator 220 will now be described in detail below.

A case where a voltage exceeding the driving voltage of the internal logic circuit 52 is induced will be described. A voltage induced by the inducing circuit 110 is rectified to a DC voltage by the third rectifying circuit 190. The rectified voltage from the third rectifying circuit 190 is divided by the voltage divider 226. The voltage divider 226 outputs a divided voltage to the comparator 222. The comparator 222 compares the divided voltage output from the voltage divider 226 with the reference voltage (Vref). At this time, the resistance of each of the resistors R1 and R2 and the reference voltage (Vref) are determined considering the driving voltage of the internal logic circuit 52 and the threshold voltage of diodes included in the third rectifying circuit 190. In other words, the resistance of each of the resistors R1 and R2 and the reference voltage (Vref) are determined such that the output signal of the comparator 222 turns on the switching circuit 224 when the output voltage of the inducing circuit 110 exceeds the driving voltage of the internal logic circuit 52. In addition, the resistance of each of the resistors R1 and R2 and the reference voltage (Vref) are determined such that the output signal of the comparator 222 turns off the switching circuit 224 when the output voltage of the inducing circuit 110 does not exceed the driving voltage of the internal logic circuit 52.

Accordingly, when the voltage exceeding the driving voltage of the internal logic circuit 52 is induced, the transistor M is turned on in response to the output signal of the comparator 222. When the transistor M is turned on, a current corresponding to the output voltage of the second rectifying circuit 140 flows to the ground. As the current corresponding to the output voltage of the second rectifying circuit 140 flows to the ground, some of the power induced by the inducing circuit 110 is consumed. As a result, all excess power induced by the inducing circuit 110 is prevented from being provided to the internal logic circuit 52. Consequently, the second regulator 220 prevents the internal logic circuit 52 from malfunctioning or breaking down due to an excessive voltage.

A case where the induced voltage does not exceed the driving voltage of the internal logic circuit 52 will now be described. The comparator 222 outputs a signal to turn off the transistor M based on the resistance of each of the resistors R1 and R2 and the reference voltage (Vref). Since the transistor M is turned off, a current corresponding to the output voltage of the second rectifying circuit 140 does not flow to the ground. As a result, all power induced by the inducing circuit 110 is used to drive the internal logic circuit 52. In other words, there is no excess power above what is required to drive the logic circuit 52.

In the above-described embodiments, the second regulator 220 includes the voltage divider 226. However, the second regulator 220 may not include the voltage divider 226 in other embodiments. In this case, the comparator 222 compares the output voltage of the third rectifying circuit 190 with the reference voltage (Vref) and controls the operation of the switching circuit 224 according to a comparison result.

As described above, according to some embodiments of the present inventive concept, a voltage adjusting circuit consumes an excessive voltage than a voltage needed to drive a contactless card, thereby preventing any excessive power from being provided to an internal logic circuit. Consequently, a malfunction and a breakdown of the contactless card can be prevented.

In addition, the voltage adjusting circuit includes a regulator after a rectifying circuit so that distortion of a data signal transmitted from a card read is reduced, thereby facilitating the restoration of the data signal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A voltage adjusting circuit, comprising:
    an inducing circuit configured to induce a voltage from electromagnetic waves;
    a first rectifying circuit configured to rectify an output signal of the inducing circuit;
    a second rectifying circuit configured to rectify the output signal of the inducing circuit;
    a third rectifying circuit configured to rectify the output signal of the inducing circuit;
    a first regulator configured to regulate an output signal of the first rectifying circuit; and
    a second regulator configured to regulate an output signal of the second rectifying circuit by connecting a current generated by an output voltage of the second rectifying circuit to ground when the output voltage of the second rectifying circuit is greater than a predetermined reference voltage, and blocking the current generated by the output voltage of the second rectifying circuit when the output voltage of the second rectifying circuit is less than the predetermined reference voltage, the second regulator controlling the output signal of the second rectifying circuit in response to an output signal of the third rectifying circuit.

2. The voltage adjusting circuit of claim 1, wherein the second regulator comprises at least one diode connected in series between an output terminal of the second rectifying circuit and a ground.

3. The voltage adjusting circuit of claim 1, wherein the second regulator comprises a diode comprising an anode connected with an output terminal of the second rectifying circuit and a cathode connected to a ground.

4. The voltage adjusting circuit of claim 1, wherein the second regulator comprises:
a comparator configured to compare the output signal of the third rectifying circuit with the predetermined reference voltage; and
a switching circuit configured to control the output signal of the second rectifying circuit in response to an output signal of the comparator.

5. The voltage adjusting circuit of claim 4, wherein the second regulator further comprises:
a voltage divider connected between an output terminal of the third rectifying circuit and an input terminal of the comparator.

6. The voltage adjusting circuit of claim 4, wherein the switching circuit is a transistor operating as a shunt.

7. The voltage adjusting circuit of claim 6, further comprising:
a first capacitor connected between an output terminal of the first rectifying circuit and a ground;
a second capacitor connected between an output terminal of the second rectifying circuit and the ground; and
a third capacitor connected between an output terminal of the third rectifying circuit and the ground.

8. A contactless card, comprising:
a voltage adjusting circuit comprising:
an inducing circuit configured to induce a voltage from electromagnetic waves;
a first rectifying circuit configured to rectify an output signal of the inducing circuit;
a second rectifying circuit configured to rectify the output signal of the inducing circuit;
a third rectifying circuit configured to rectify the output signal of the inducing circuit;
a first regulator configured to regulate an output signal of the first rectifying circuit; and
a second regulator configured to regulate an output signal of the second rectifying circuit by connecting a current generated by an output voltage of the second rectifying circuit to ground when the output voltage of the second rectifying circuit is greater than a predetermined reference voltage, and blocking the current generated by the output voltage of the second rectifying circuit when the output voltage of the second rectifying circuit is less than the predetermined reference voltage, the second regulator controlling the output signal of the second rectifying circuit in response to an output signal of the third rectifying circuit; and
an internal logic circuit configured to receive a direct current (DC) voltage from the first regulator and process data received or transmitted through the inducing circuit.

9. The contactless card of claim 8, wherein the second regulator comprises at least one diode connected in series between an output terminal of the second rectifying circuit and a ground.

10. The contactless card of claim 8, wherein the second regulator comprises:
a comparator configured to compare the output signal of the third rectifying circuit with the predetermined reference voltage; and
a switching circuit configured to control the output signal of the second rectifying circuit in response to an output signal of the comparator.

11. A contactless card system, comprising:
a contactless card comprising:
a voltage adjusting circuit comprising:
an inducing circuit configured to induce a voltage from electromagnetic waves;
a first rectifying circuit configured to rectify an output signal of the inducing circuit;
a second rectifying circuit configured to rectify the output signal of the inducing circuit;
a third rectifying circuit configured to rectify the output signal of the inducing circuit;
a first regulator configured to regulate an output signal of the first rectifying circuit; and
a second regulator configured to regulate an output signal of the second rectifying circuit by connecting a current generated by an output voltage of the second rectifying circuit to ground when the output voltage of the second rectifying circuit is greater than a predetermined reference voltage, and blocking the current generated by the output voltage of the second rectifying circuit when the output voltage of the second rectifying circuit is less than the predetermined reference voltage, the second regulator controlling the output signal of the second rectifying circuit in response to an output signal of the third rectifying circuit; and
an internal logic circuit configured to receive a direct current (DC) voltage from the first regulator and process data received or transmitted through the inducing circuit; and
a card reader configured to supply power to the contactless card using a radio system and communicate with the contactless card.

12. The contactless card system of claim 11, wherein the second regulator comprises at least one diode connected in series between an output terminal of the second rectifying circuit and a ground.

13. A contactless card, comprising:
a voltage adjusting circuit comprising: a first rectifying circuit configured to rectify an induced voltage; a second rectifying circuit configured to rectify the induced voltage; and a regulating system configured to regulate an output signal of the first rectifying circuit, and to regulate an output signal of the second rectifying circuit by connecting a current generated by an output voltage of the second rectifying circuit to ground when the output voltage of the second rectifying circuit is greater than a predetermined reference voltage, and blocking the current generated by the output voltage of the second rectifying circuit when the output voltage of the second rectifying circuit is less than the predetermined reference voltage; and
a third rectifying circuit configured to rectify the induced voltage such that the regulating system regulates an output signal of the third rectifying circuit and controls the regulated output signal of the second rectifying circuit based on the regulated output signal of the third rectifying circuit.

14. The contactless card of claim 13, further comprising:
an inducing circuit configured to generate the induced voltage from received electromagnetic waves.

15. The contactless card of claim 13, wherein the regulating system comprises:
   a first regulator configured to regulate the output signal of the first rectifying circuit; and
   a second regulator configured to regulate the output signal of the second rectifying circuit.

16. The contactless card of claim 13, wherein the regulating system comprises: a comparator configured to compare the output signal of the third rectifying circuit with the predetermined reference voltage; and a switching circuit configured to control the output signal of the second rectifying circuit in response to an output signal of the comparator.

* * * * *